United States Patent [19]

Hoj

[11] Patent Number: 4,863,670

[45] Date of Patent: Sep. 5, 1989

[54] METHOD FOR THE MOLECULAR ORIENTATION OF PLASTIC MATERIAL

[75] Inventor: Peter P. Hoj, Espergärde, Denmark

[73] Assignee: Tetra Pak Developpement SA, Pully, Switzerland

[21] Appl. No.: 550,712

[22] Filed: Nov. 10, 1983

Related U.S. Application Data

[63] Continuation of Ser. No. 357,642, Mar. 12, 1982, abandoned.

[30] Foreign Application Priority Data

Mar. 13, 1981 [CH] Switzerland ........................ 1740/81

[51] Int. Cl.[4] ............................................ B29C 55/16

[52] U.S. Cl. .................................. 264/562; 264/566; 264/178 R; 264/289.6; 425/66; 425/71; 425/326.1

[58] Field of Search ..................... 264/289.6, 558–566, 264/178 R, 181; 425/326.1, 66, 71

[56] References Cited

U.S. PATENT DOCUMENTS

| | | | |
|---|---|---|---|
| 2,804,642 | 9/1957 | Milne | 264/561 |
| 2,979,777 | 4/1961 | Goldman | 264/558 |
| 2,987,776 | 6/1961 | Miller | 264/558 |
| 3,090,991 | 5/1963 | Hathaway | 425/66 |
| 3,121,760 | 2/1964 | Kline | 264/558 |
| 3,260,776 | 7/1966 | Lindstrom, Jr. et al. | 264/567 |
| 3,291,876 | 12/1966 | Justus | 264/564 |
| 3,296,344 | 1/1967 | Timmerman | 264/560 |
| 3,306,963 | 2/1967 | Wisseroth | 264/178 R |
| 3,466,356 | 9/1969 | Carlson | 264/567 |
| 3,608,019 | 9/1971 | Sato | 264/567 |

FOREIGN PATENT DOCUMENTS

| | | | |
|---|---|---|---|
| 67799 | 5/1969 | Fed. Rep. of Germany . | |
| 55-100118 | 7/1980 | Japan | 264/209.5 |

*Primary Examiner*—Jeffery Thurlow

*Attorney, Agent, or Firm*—Burns, Doane, Swecker & Mathis

[57] ABSTRACT

A method for the molecular orientation of plastic material by expanding a tube of plastic material, includes introducing the tube into a container filled with heated liquid, preferably water of a temperature of 70°–100° C. The tube is expanded by introducing a pressurized liquid into the tube. An apparatus for carrying out the method and a plastic material are also disclosed.

3 Claims, 1 Drawing Sheet

METHOD FOR THE MOLECULAR ORIENTATION OF PLASTIC MATERIAL

This application is a continuation of application Ser. No. 357,642, filed Mar. 12, 1982 abandoned.

BACKGROUND AND SUMMARY OF THE PRESENT INVENTION

The present invention relates generally to a method and apparatus for orienting a plastic. More specifically, the present invention relates to a method for the preferably biaxial molecular orientation of plastic material and also to an arrangement for the realization of the method. The present invention also relates to a plastic material manufactured in accordance with the method.

Within the technique of packaging, polyethylene terephthalate (PET), or polyester as it is called more popularly, is used for the manufacture of packages for pressurized contents. The reason is that the polyester material has good mechanical strength characteristics which can be improved further if the material is molecular-oriented. A molecular orientation is achieved by stretching the material within a certain temperature range, which for polyester is 70°–100° C. If the temperature is too low it will be impossible on the whole to stretch the material without tearing the same, and if the temperature is too high only a thinning of the material will take place, but not the intended molecular orientation. If a stretching of the material is carried out within the specified temperature range, a molecular orientation is obtained, the extent of which depends partly on the temperature, and partly on the degree of stretching. As mentioned earlier, the mechanical characteristics, e.g. the ultimate tensile strength, are substantially improved by molecular orientation. A stretching of the material in one direction produces a so-called monoaxial orientation, that is to say the material will be molecular-orientated only in one direction, which means that the improved strength characteristics of the plastic material are obtained only in the direction the material was pulled. For many purposes a monoaxial stretching is sufficient, but e.g. for containers with pressurized contents, e.g. bottles or other packages for beer or refreshing beverages, the stresses in the material will be effective not only in one direction. This means that the improved strength characteristics in the direction the material was pulled cannot be utilized, because the material does not possess correspondingly good strength characteristics in the direction which is perpendicular to the direction of orientation. This difficulty can be overcome, however, if the material is oriented biaxially, that is to say in two directions right-angled to one another, to give a plastic material which in principle is of uniform strength.

On blowing polyester bottles, an expansion occurs not only in one direction, but the material is oriented biaxially, if the blowing is carried out within the temperature range specified earlier. Such blown polyester bottles have found much use for the packaging of e.g. refreshing beverages, but it is a disadvantage of these bottles, that an individual blowing of bottles brings about a low production capacity and hence an expensive product. Furthermore the orientation obtained in the blowing of these bottles is not uniform, but the orientation in the longitudinal direction is generally considerably less than the orientation in transverse direction of the bottle, and the degree of orientation within the different parts of the bottle, the bottom, the barrel part, the neck portion etc. show a wide variation of orientation.

Thus there is need for a relatively uniform biaxially oriented polyester material. Such a material can be produced, using the existing technique, in that a non-oriented material web is gripped with special grippers along its edge zones and is stretched in transverse direction of the web by the grippers being moved away from each other. At the same time the web is possibly stretched in its longitudinal direction. However such an orientation procedure produces a very high wastage (up to 40%) and is therefore expensive to use.

The present invention, however, suggests a method for the biaxial orientation with a relatively uniform degree of orientation of a plastic material, in particular polyester material. The invention is characterized in that a tube of non-oriented, or previously longitudinally oriented, plastic material is introduced into a container filled with heated liquid. Preferably a heated liquid under pressure is introduced into the interior of the tube which, owing to the internal pressure prevailing in the tube, is thereby made to expand, preferably in transverse direction of the tube, at the same time as the part of the tube situated in the container, which has been conditioned through heating by the heated liquid, is orientation-stretched in its longitudinal direction.

BRIEF DESCRIPTION OF THE DRAWINGS

In the following the present invention will be described with reference to the enclosed schematic drawings, wherein.

DETAILED DESCRIPTION OF THE PREFERRED EMBODIMENT

Figure 1:
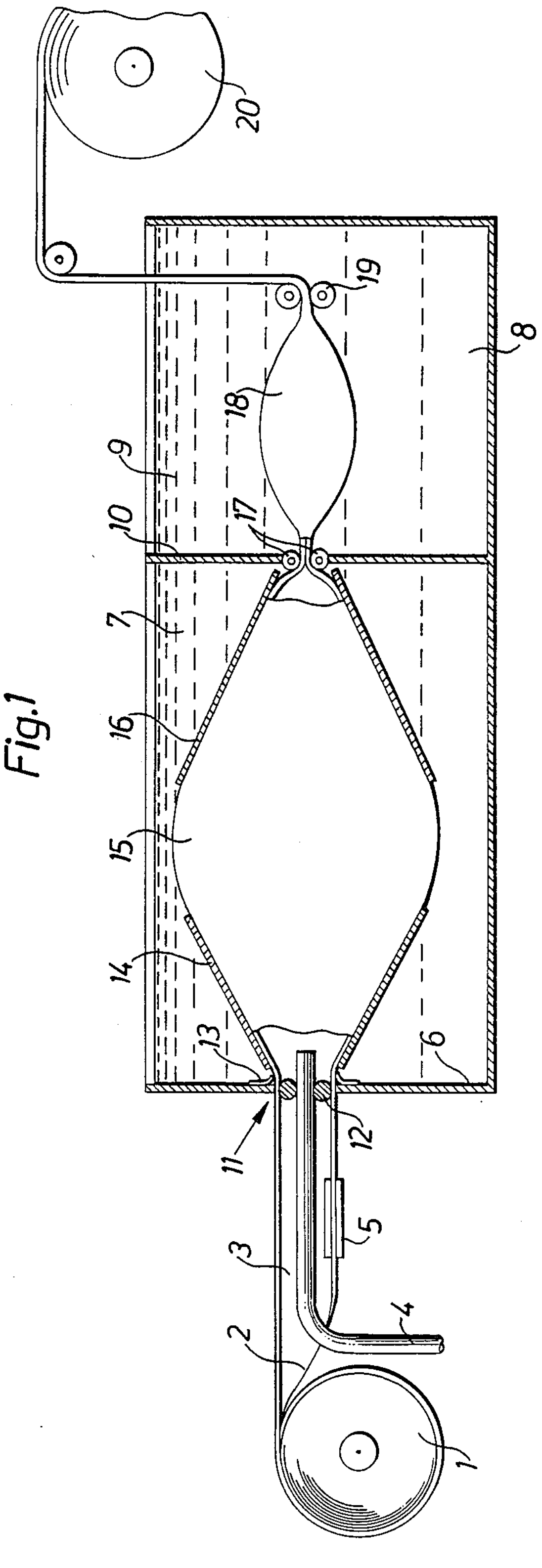
FIG. 1 is a schematic side elevational view in cross-section of an arrangement for the realization of the method in accordance with the invention.
Figure 2:
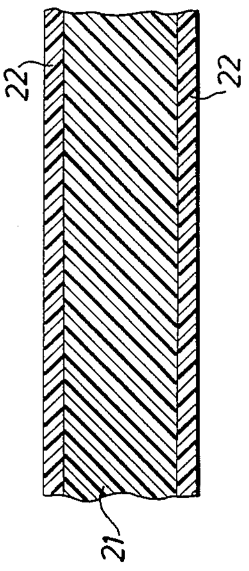
FIG. 2 is a greatly enlarged cross-sectional view of an orientation-stretched polyester laminate.

The arrangement shown schematically in FIG. 1 for the realization of the method in accordance with the present invention includes a magazine roll 1 containing a prefabricated web 2 of non-oriented or longitudinally oriented plastic material, e.g. a laminate of the type which is shown in FIG. 2. The web 2 is folded into a tube 3 by a forming device, not shown here, which joins the edge zones of the web 2 together in an overlap joint.

The sealing of the overlap joint is carried out by a sealing device 5, with the help of which the overlapping edge zones are heated to surface fusion and they are joined together by being pressed to one another at the same time. Into the part of the tube open towards the back, a filler pipe 4 for the supply of pressure liquid is introduced, and the pipe 4 extends through the tube 3 in a container 6 through an opening 11 in the side wall of the container. The tube 3 is also introduced through the opening 11 in the side wall of the container, the opening 11 of the container 6 being provided with an elastic sealing sleeve 13 which is fixed in the container 6 along the periphery of the opening 11 and whose outer parts are arranged so that they form a seal against the outside of the tube 3. Around the front part of the filler pipe 4, moreover, a sealing ring 12 is provided which forms a seal against the filler pipe 4 and forms a seal against the inside of the tube 3.

The container 6 is filled with a liquid 7, preferably water, and is provided with devices for the heating of the liquid to a temperature of between 70° and 100° C., preferably approx. 80°-90° C. Thermostats, not shown here, are arranged so as to control the temperature of the liquid 7 at the desired level. The outlet opening of the container 6 is constituted of two parallel rollers 17, which are arranged in the side wall 10 and which jointly form an elongated opening through which the orientation-stretched tube 3 can be passed in a flattened condition. To guide the part of the tube 15 situated in the liquid bath 7 of the container 6 are provided, on the one hand a preferably conical guide screen or surface 14, arranged at the inlet opening of the container, and on the other hand, guide surfaces 16 converging towards the outlet opening 17 of the container 6. From the outlet opening 17 in the wall 10 the oriented and flattened tube 3 is introduced into a second compartment 8, and this too is filled with liquid, but with a liquid 9 of lower temperature, approx. 10°-20° C. In the second container 8, moreover, co-operating compression rollers 19 are provided, between which the cooled tube is flattened, whereupon the flattened tube is passed upwards, out of the liquid bath 9, finally to be wound up onto a magazine roll 20.

FIG. 2 shows a greatly enlarged cross-section of an orientation-stretched laminate in accordance with the invention, which laminate in the case described here is assumed to include a central basis layer 21 of an orientation-stretched polyester material, to which in the orientation-stretching a crystalline structure is imparted. Outer, thinner, coating layers 22 of so-called glycol-modified polyester (PETG) are provided on either side of the central layer 21. These outer layers 22 have a substantially amorphous molecular structure, even after the orientation stretching.

The method in accordance with the invention includes rolling off a web 2 of plastic material from the magazine roll 1 and the plastic material described here is assumed to be non-oriented. e.g. a polyesterlaminate of the type as shown in FIG. 2. The non-oriented web 2 is folded into a tube which is sealed in a longitudinal joint with the help of sealing device 5, and which is introduced into the container 6 through the opening 11. The outside of the tube 3 is sealed against the opening 11 by an elastic sealing sleeve which is fixed around the periphery of the opening 11.

The container 6, which appropriately has thermally insulated walls, is filled with a liquid 7, preferably water, which is heated to a temperature suitable for the orientation-stretching of the material, which for polyester is approx. 80°-90° C. When the tube 3 is introduced into the liquid bath 7 of the container 6, the plastic material in the tube is heated so that it gradually assumes the same temperature as the liquid bath and is thus conditioned in a suitable manner for the orientating stretching operation. Through the filler pipe 4, which is introduced into the tube 3 and which ends in the part of the tube 3 which is located inside the container 5, a pressurized liquid is introduced, which preferably may be water. To obtain sufficient heating of the inside of the plastic tube 3, the pressurized liquid should be heated to approx. 90° C. The pressure of the liquid must be adapted to the diameter of the tube 3 and may vary in practice between 2 and 15 kg pressure. To allow the maintaining of the liquid pressure in the part 15 of the plastic tube 3 which is located inside the container 6, the tube 3 has to be sealed off. This is done with the help of a sealing ring 12 which is arranged around the filler pipe 4 in such a manner that it also forms a seal against the inside of the tube 3. To obtain a better seal it is appropriate to arrange the sealing ring 12 just in the region of the opening 11 so that the sealing ring 12 can obtain support from the inside of the opening 11. However a certain leakage has to be accepted.

Owing to the plastic material in the part of the tube being heated to approx. 80°-90° C. and being subjected to an internal pressure, tensile stresses arise in the material which have the result that the tube expands in the manner as shown in FIG. 1. The expansion of the tube is guided with the help of a conformal backing surface 14. Because of the expansion of the tube 3 at the specified temperature, a molecular orientation arises in the plastic material in the transverse direction of the tube, which means that the tensile strength of the material in that direction increases in a drastic manner, at the same time as the material becomes thinner by being extended.

Besides the transverse orientation of the tube 3, a longitudinal orientation is carried out, in that the tube part 15, on leaving the container 6, is flattened and drawn between preferably driven rollers 17. The rollers 17 in the partition wall between the container 6 and the container 8 take up between them the tube part 15 and the rollers 17 together form an elongated space in the container wall 10. The flattening of the tube 15 is guided with the help of converging guide surfaces 16 and the drive of the cylinders or rollers 17 is controlled in such a manner that the desired stretching of the tube part 15 in longitudinal direction of the tube is obtained. The flattened and biaxially oriented tube, leaving through the elongated space between the cylinders 17, is introduced into a second container 8 wherein a cooling bath 9 is located containing water of a temperature of approx. 10° C. Owing to a certain leakage between the cylinders 17, the tube part 18, which is located in the container 8, will be somewhat inflated which, however, does not influence the course of the cooling and stabilization process. Finally the tube part 18 is wound onto a magazine roll 20.

The treatment of the biaxially stretched plastic tube is now complete and the tube, if so desired, can be slit open so as to form a single material web.

The advantage in using a plastic laminate in accordance with FIG. 2, that is to say a laminate comprising a central layer 21 of ordinary standard polyester and outer coating layers 22 of so-called glycol-modified polyester (PETG), is that the material can be heat-sealed.

Normally orientation-stretched polyester material cannot be sealed, owing to the crystalline structure imparted to the polyester material during molecular orientation. The glycol-modified polyester material, however, which has very good adhesion capacity in comparison to ordinary polyester, has the characteristic that it does not crystallize to an appeciable degree when it is subjected to orientation-stretching. Thus the two layers 22 of glycol-modified polyester may be heat-sealed, even after orientation-stretching of the material.

It has been found that by application of the method in accordance with the invention, in an inexpensive and rational manner, a biaxially oriented polyester material can be produced. This oriented polyester material can be heat-sealed, which is of great value in package manufacture which comprises forming and sealing.

It is possible within the framework of the concept of the invention to modify the arrangement described and the laminate combination described in a number of different ways, but the arrangement described here has proved advantageous and functionally effective.

Various modifications and alterations to the above-described specific embodiments will be apparent to those skilled in the art. Accordingly, the foregoing detailed description should be considered exemplary in nature and not as limiting in the scope and spirit of the invention as set forth in the appended claims.

What is claimed is:

1. A method for the biaxial molecular orientation of a plastic material having at least one layer of polyester, comprising the steps of:

sealing together overlapping edge zones of a sheet of the plastic material to form a tube;

continuously introducing the tube of plastic material into a first heated liquid thereby heating said tube;

introducing a second heated liquid into the interior of said tube, the first and second liquids each having a temperature of 70°-100° C.;

maintaining said first liquid at a lower pressure than said second liquid thereby controllably expanding the material by the internal pressure prevailing in said tube to orient the plastic material in a transverse direction;

controllably stretching the expanded material longitudinally concurrently with the expansion in the transverse direction while the material is entirely within the first liquid to orient the plastic material in a longitudinal direction; and subsequently introducing said tube into a third liquid, said third liquid being maintained at a temperature below that of said first heated liquid for cooling said molecular oriented tube.

2. The method of claim 1, wherein as the tube is longitudinally stretched the tube is also flattened and compressed.

3. The method of claim 1, wherein the heated first liquid and the heated and pressurized second liquid are both water.

* * * * *